(12) United States Patent
Moss et al.

(10) Patent No.: US 7,125,036 B2
(45) Date of Patent: *Oct. 24, 2006

(54) MONOLITHIC, DOUBLE-BALL HITCH

(75) Inventors: Newall Ryan Moss, Mapleton, UT (US); Jack W. Bowers, Springville, UT (US); H. Arthur Wing, Provo, UT (US)

(73) Assignee: B&W Custom Truck Beds, Inc., Humboldt, KS (US)

( * ) Notice: Subject to any disclaimer, the term of this patent is extended or adjusted under 35 U.S.C. 154(b) by 51 days.

This patent is subject to a terminal disclaimer.

(21) Appl. No.: 10/995,884

(22) Filed: Nov. 23, 2004

(65) Prior Publication Data

US 2005/0067812 A1 Mar. 31, 2005

Related U.S. Application Data

(63) Continuation of application No. 10/078,322, filed on Feb. 12, 2002.

(60) Provisional application No. 60/268,746, filed on Feb. 14, 2001.

(51) Int. Cl.
*B60D 1/06* (2006.01)
(52) U.S. Cl. .................. 280/511; 280/456.1; 280/478.1
(58) Field of Classification Search ............. 280/415.1, 280/416.1, 456.1, 478.1, 511
See application file for complete search history.

(56) References Cited

U.S. PATENT DOCUMENTS

| | | | |
|---|---|---|---|
| 2,221,278 A | 11/1940 | Utterback |
| 2,547,299 A | 4/1951 | Williams |
| 2,576,383 A | 11/1951 | Avery |
| 2,604,331 A | 7/1952 | Kingston |
| 2,823,930 A | 2/1958 | Cooper |
| 2,849,243 A | 8/1958 | Halverson |
| 2,872,213 A | 2/1959 | Hosford |
| 2,889,155 A | 6/1959 | Sandage |
| 3,117,805 A | 1/1964 | Schoeffler |
| 3,630,546 A | 12/1971 | Church |
| 3,655,221 A | 4/1972 | Warner |
| 3,664,686 A | 5/1972 | Anderson |
| 3,717,362 A | 2/1973 | Johnson |
| 3,734,540 A | 5/1973 | Thiermann |
| 3,751,072 A | 8/1973 | Williams |
| 3,779,653 A | 12/1973 | Charlton |
| 3,801,134 A | 4/1974 | Dees |
| 3,891,238 A | 6/1975 | Ehlert |

(Continued)

FOREIGN PATENT DOCUMENTS

BE  715 681 A  10/1968

(Continued)

OTHER PUBLICATIONS

JC Whitney Catalog, Business Edition Catalog No. 630B, pp. 79-81

(Continued)

*Primary Examiner*—Lesley D. Morris
*Assistant Examiner*—Matthew Luby
(74) *Attorney, Agent, or Firm*—TraskBritt

(57) ABSTRACT

A hitch for presenting different sized ball hitches for towing use. The hitch may include a first ball and pedestal extending in a first direction. A second ball and pedestal may extend in a second direction, distinct from the first direction. The first ball and pedestal and the second ball and pedestal may be homogenously formed of a single material to form a monolith. A stem may connect to the monolith to support and present the first ball and pedestal and the second ball and pedestal for towing use. The stem may extend away from the monolith in a third direction, distinct from both the first and second directions.

20 Claims, 9 Drawing Sheets

U.S. PATENT DOCUMENTS

| | | |
|---|---|---|
| 3,963,266 A | 6/1976 | Thelin |
| 3,979,138 A | 9/1976 | George et al. |
| 4,022,490 A | 5/1977 | Rocksvold |
| 4,033,601 A | 7/1977 | Lindahl et al. |
| 4,232,877 A | 11/1980 | Milton |
| 4,248,450 A | 2/1981 | McWethy |
| 4,275,899 A | 6/1981 | Humphrey |
| 4,456,279 A | 6/1984 | Dirck |
| 4,482,167 A | 11/1984 | Haugrud |
| 4,492,386 A | 1/1985 | Roberts |
| 4,568,098 A | 2/1986 | Landry, Jr. |
| 4,610,457 A | 9/1986 | Harmon |
| 4,662,647 A | 5/1987 | Calvert |
| 4,697,818 A | 10/1987 | Moore |
| 4,711,461 A | 12/1987 | Fromberg |
| 4,721,324 A | 1/1988 | Blacklaw |
| 4,758,015 A | 7/1988 | Pixley |
| 4,772,039 A | 9/1988 | Cook |
| 4,792,153 A | 12/1988 | Galdes |
| 4,807,899 A | 2/1989 | Belcher |
| 4,807,900 A | 2/1989 | Tate |
| 4,844,498 A | 7/1989 | Kerins et al. |
| 4,938,496 A | 7/1990 | Thomas et al. |
| 4,944,525 A | 7/1990 | Landry |
| 4,951,957 A | 8/1990 | Gullickson |
| 5,000,473 A | 3/1991 | Johnson |
| 5,033,764 A | 7/1991 | Blacklaw |
| 5,088,754 A | 2/1992 | Skelton |
| 5,106,114 A | 4/1992 | Haupt |
| 5,135,247 A | 8/1992 | Alfaro et al. |
| 5,288,095 A | 2/1994 | Swindall |
| 5,312,128 A | 5/1994 | Blacklaw |
| 5,322,313 A | 6/1994 | Schroeder |
| 5,322,315 A | 6/1994 | Carsten |
| 5,332,250 A | 7/1994 | Thorwall et al. |
| 5,351,982 A | 10/1994 | Walrath |
| 5,375,867 A | 12/1994 | Kass et al. |
| 5,413,366 A | 5/1995 | Gibbons |
| 5,465,991 A | 11/1995 | Kass et al. |
| 5,503,423 A | 4/1996 | Roberts et al. |
| 5,547,210 A | 8/1996 | Dugger |
| 5,560,630 A | 10/1996 | Phares et al. |
| 5,580,088 A | 12/1996 | Griffith |
| 5,725,229 A | 3/1998 | McWethy |
| 5,727,805 A | 3/1998 | LaRoque |
| 5,741,022 A | 4/1998 | Wass et al. |
| 5,806,872 A | 9/1998 | Szczypski |
| 5,839,744 A | 11/1998 | Marks |
| 5,857,693 A | 1/1999 | Clark, Jr. |
| 5,860,669 A | 1/1999 | Wass et al. |
| 5,871,222 A | 2/1999 | Webb |
| 5,890,727 A | 4/1999 | May |
| D409,124 S | 5/1999 | Bank |
| 5,906,387 A | 5/1999 | Wallace |
| 5,915,714 A | 6/1999 | Bell et al. |
| 5,934,698 A | 8/1999 | Despain |
| 6,092,827 A | 7/2000 | Korpi et al. |
| 6,116,633 A | 9/2000 | Pride |
| 6,139,043 A | 10/2000 | Gries et al. |
| 6,142,238 A | 11/2000 | Holt et al. |
| 6,149,181 A | 11/2000 | Biederman |
| 6,189,910 B1 | 2/2001 | Bartel |
| 6,460,870 B1 | 10/2002 | Moss |
| 6,481,739 B1 | 11/2002 | Newkirk |
| 6,712,381 B1 | 3/2004 | Moss |
| 6,857,650 B1 | 2/2005 | Ward |
| 2003/0006581 A1 | 1/2003 | Moss et al. |
| 2003/0052472 A1 | 3/2003 | Moss et al. |
| 2003/0218314 A1 | 11/2003 | Moss |

FOREIGN PATENT DOCUMENTS

| | | |
|---|---|---|
| DE | 3639183 | 8/1987 |
| FR | 2227739 | 11/1974 |
| FR | 2450167 | 10/1980 |

OTHER PUBLICATIONS

Boating Life, p. 89, Sep./Oct. 1999.
Trailer Boats, p. 90, Sep. 1999.
Herrington, The Enthusiasts Catalog, p. 1, Memorial Day '00.
Northern Tool & Equipment Co., pp. 278-281, Summer 2000.

MONOLITHIC, DOUBLE-BALL HITCH

CROSS-REFERENCE TO RELATED APPLICATIONS

This application is a continuation of application Ser. No. 10/078,322, filed Feb. 12, 2002, pending, which claims the benefit of U.S. Provisional Application Ser. No. 60/268,746, filed on Feb. 14, 2001, and entitled Pivoting Underslung Stowaway Hitch Mount.

BACKGROUND OF THE INVENTION

1. Field of the Invention

This invention relates to towing apparatus and, more particularly, to novel systems and methods for securing trailers to towing vehicles with hitches.

2. State of the Art

Trailers have been towed since the earliest days of the wheel. A cart or wagon towed behind an animal is a trailer. In modern times, trailers are secured to towing vehicles by a multiplicity of methods, including frame-mounted hitches and bumper-mounted hitches. Tractor-trailer rigs use fifth-wheel towing systems. Similarly, recreational vehicles sometimes use fifth-wheel towing systems or often a receiver-type mounted ball hitch.

A receiver hitch relies on a receiver cavity or tube securely mounted to the frame of a towing vehicle. The receiver is reinforced and provided with an aperture for receiving a trunnion. A trunnion, supporting a hitch, may be secured into the receiver. The hitch may be a pin, pintle, or ball type hitch, typically, but need not be limited thereto.

For recreational users, receiver-type hitches present several common problems. The more important problem may be the difficulty of attaching a greasy hitch to a vehicle and detaching the same after use. Although receiver-type hitches are generally adaptable to receive various trunnions with various types of hitches, the very nature of a receiver hitch may make it problematic. If a trunnion is not removed after use, then a person may accidentally strike a shin or knee on the extending hitch or trunnion when no towed vehicle is attached. If the hitch is removed, it is cumbersome to move, requires some immediate storage place, and may be filthy with grease. Due to the weight of the hitch and trunnion assembly, a person removing the trunnion and hitch from a receiver is likely to soil clothing.

Thus, it would be an advance in the art to provide a hitch mount that can be stowed without projecting inconveniently far from the bumper, substantially within the envelope of a vehicle, or even without extending behind the bumper on certain embodiments.

Any towed devices require one of several, common, different sizes of ball hitches. Accordingly, selective stowage and presentation of multiple sizes of ball hitches on a single mount, alone or in combination, without having to use a tool to replace the ball hitch, would be a benefit and convenience.

One may desire that the sizes and ratings of two ball hitches to be used together be different, yet that each ball hitch be adequately supported, with reasonably balanced support of loading in all portions or regions thereof (e.g. neck, ball, stud. etc.). Accordingly, it would be an advance in the art to provide a method for designing a ball hitch, or a set of ball hitches that could accommodate the load and geometric considerations that both balls will need to function at full, rated load, and all expected conditions.

BRIEF SUMMARY OF THE INVENTION

In view of the foregoing, a system in accordance with the present invention provides a monolithic double-ball hitch for supporting full capacity load ratings according to the size of ball selected. Such a system also provides interchanging ball hitches of different sizes with minimal effort.

Consistent with the foregoing, and in accordance with the invention as embodied and broadly described herein, an apparatus is disclosed in suitable detail to enable one of ordinary skill in the art to make and use the invention. In certain embodiments, an apparatus in accordance with the present invention may provide a hitch for presenting different sized ball hitches for towing use. The hitch may include a first ball hitch extending in a first direction. A second ball hitch may extend in a second direction, distinct from the first direction.

The first ball hitch and the second ball hitch may be homogeneously formed of a single material to form a monolith. A stem may connect to the monolith to support and selectively present the first ball hitch and the second ball hitch for towing use. The stem may extend away from the monolith in a third direction, distinct from both the first and second directions.

The stem may engage any suitable hitch mount, including stowable hitch mounts. Additionally, the stem of a monolithic, double-ball hitch may secure to, or provide, a trunnion for securing the hitch to a receiver secured to the undercarriage of a vehicle. A trunnion in accordance with the present invention may have any suitable cross-section and may have apertures formed therein to provide multiple securement locations between the trunnion and the receiver.

If desired, a detent mechanism may facilitate position of parts moving with respect to one another. In certain embodiments, a detent mechanism may facilitate position of a trunnion within a receiver. Additionally, dampers may be applied to a trunnion to reduce chatter and vibrations between a trunnion and a corresponding receiver. Moreover, many useful components may be secured to a trunnion. For example, a holder, such as a flagpole standard may secure to a trunnion to provide securement to vehicle.

BRIEF DESCRIPTION OF THE SEVERAL VIEWS OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE INVENTION

It will be readily understood that the components of the present invention, as generally described and illustrated in the Figures herein, may be arranged and designed in a wide variety of different configurations. Thus, the following more detailed description of the embodiments of the system and method of the present invention, as represented in FIGS. 1 through 16, is not intended to limit the scope of the invention. The scope of the invention is as broad as claimed herein. The illustrations are merely representative of certain, presently preferred embodiments of the invention. Those presently preferred embodiments of the invention will be best understood by reference to the drawings, wherein like parts are designated by like numerals.

Those of ordinary skill in the art will, of course, appreciate that various modifications to the details of the figures may easily be made without departing from the essential characteristics of the invention. Thus, the following description of the figures is intended only by way of example and simply illustrates certain presently preferred embodiments consistent with the invention as claimed.

Figure 1:
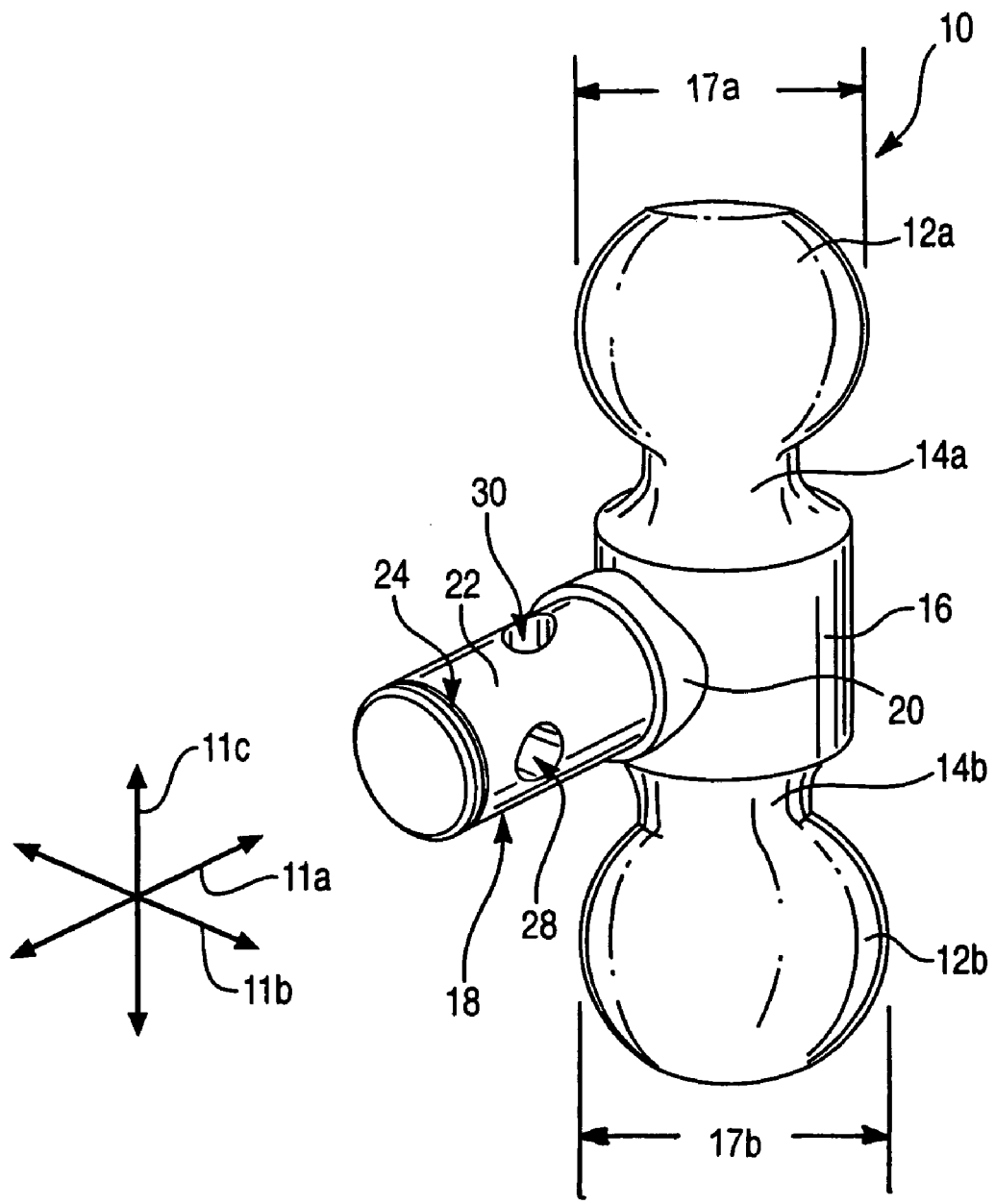
FIG. 1 is a perspective view of a monolithic, double-ball hitch and spindle in accordance with the present invention.

Referring to FIG. 1, a hitch 10 in accordance with the present invention may be configured to include two balls 12a, 12b homogenously formed of a single material. Each ball 12a, 12b may be supported by a corresponding neck 14a, 14b or pedestal 14a, 14b. An intermediate portion 16 may connect one pedestal 14a to the other pedestal 14b.

The geometry of the balls 12 and pedestals 14 may be selected to facilitate engagement with a suitable ball socket as would be secured to the vehicle to be towed. In certain embodiments, the diameter 17a of one ball 12a may be different from the diameter 17b of the other ball 12b. The diameters 17a, 17b may be selected to correspond to a desired common size of ball sockets found on vehicles to be towed.

The balls 12, pedestals 14, and intermediate portion 16 may be formed of any suitable material. Such a material may be selected for high yield strength. Suitable materials may include a metal or metal alloy. In selected embodiments, the balls 12, pedestals 14, and intermediate portion 16 may be formed of a single, homogeneous, monolith of cast, fabricated, or forged steel.

In certain embodiments, a stem 18 may extend from the intermediate portion 16. The stem 18 may be homogeneously formed with the intermediate portion 16, or may be secured by another suitable method. For example, the stem 18 may be threaded, pinned, welded, riveted, or the like, into the intermediate portion 16 to form an integrated, rigid unit. Additionally, the stem 18 may be formed as a single, homogeneous, monolith with balls 12, pedestals 14, and intermediate portion 16. Similar to the balls 12, pedestals 14, and intermediate portion 16, a stem 18 may be constructed of any suitable material having the required yield strength, ductility, and the like.

The dimensions of the intermediate portion 16 and the stem 18 may be selected to provide a desired load-bearing capacity. The type of interface between the intermediate portion 16 and the stem 18 may also affect the dimensions. For example, when the stem 18 is threaded into the intermediate portion 16, the intermediate portion 16 may need to be larger to compensate for the aperture and the weakening resulting therefrom.

Figure 2:
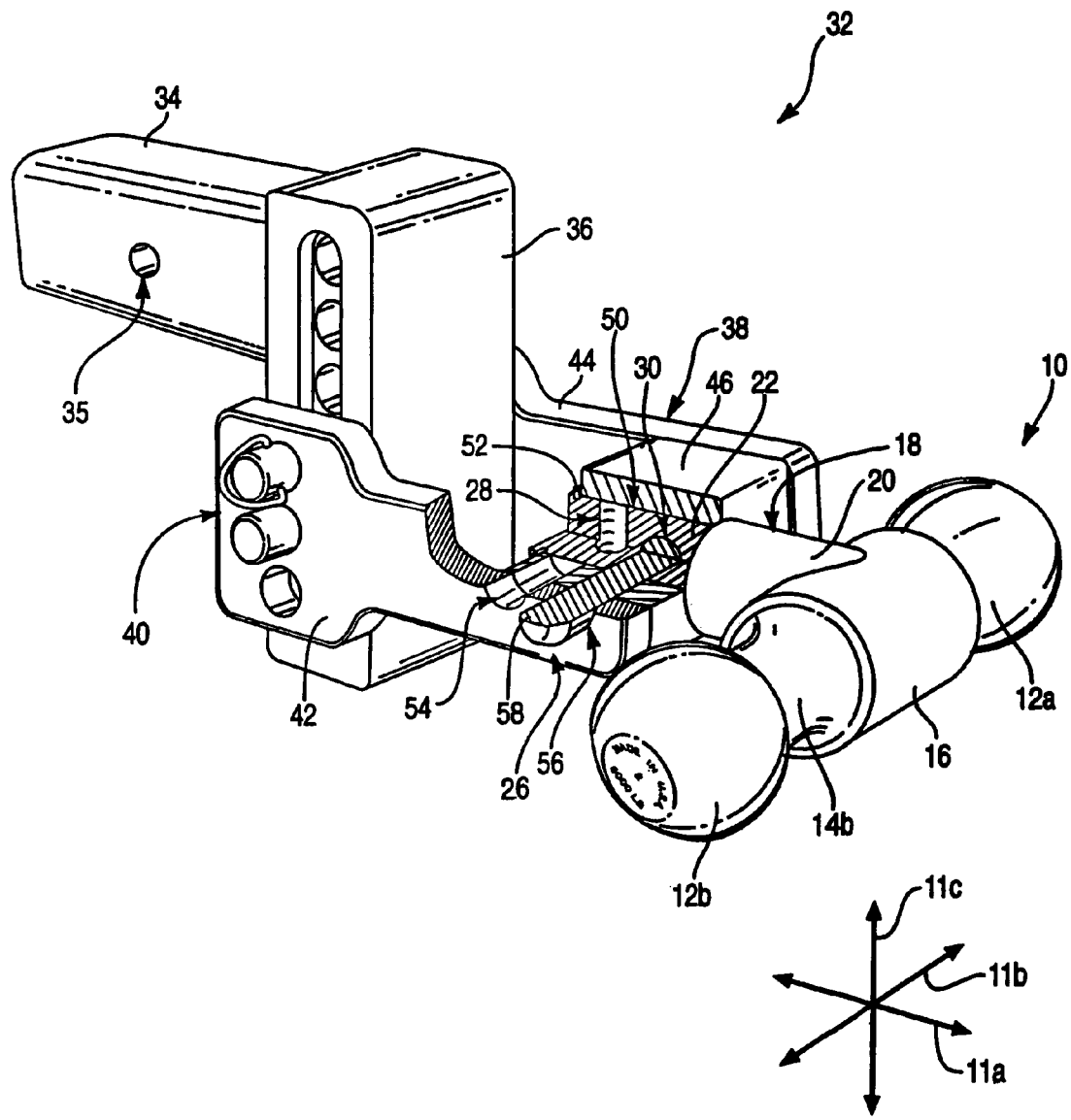
FIG. 2 is a perspective, partial cut-away view of a stowable hitch utilizing the monolithic, double-ball of FIG. 1.

Referring to FIGS. 1 and 2, a stem 18 in accordance with the present invention may be configured to engage various structures. These various structures may include the undercarriage of a vehicle, a receiver mounted to the frame, undercarriage, or bumper of a vehicle, or the like. The stem 18 may be configured to provide a rigid engagement.

In other embodiments, the stem 18 may be configured to rotatably secure to a corresponding structure. For example, the stem 18 may have a shoulder 20 and a shaft 22 or spindle 22. A retainer 24 may provide a method for retaining the spindle 22 in place. A lock 26 may maintain the spindle 22 at a desired degree of location. In one embodiment, the lock 26 may simply consist of first and second locking apertures 28, 30.

In certain embodiments, a hitch 10 in accordance with the present invention may be applied to a stowable hitch system 32. Such a hitch system 32 may include a trunnion 34 sized to fit within a receiver secured to the undercarriage of a vehicle. An aperture 35 may be formed in the trunnion 34 to provide a method for pinning and securing the trunnion 34 within the receiver.

A base 36 may be secured to the trunnion 34. A mount 38 may pivotably engage the base 36. A pivoting system 40 may provide the pivoting motion between the mount 38 and base 36 as well as provide for a lock for preventing such motion. In certain embodiments, the mount 38 may consist of a first flange 42 and a second flange 44 securing a platform 46 therebetween. Such a stowable hitch 32 is described in greater detail in U.S. patent application Ser. No.

09/699,279 filed on Oct. 26, 2000, entitled Pivoting, Underslung, Stowaway, Hitch Mount, incorporated herein by reference.

A stem 18 in accordance with the present invention may rotatably engage the platform 46 of a stowable hitch 32. The platform 46 may have an aperture 50 formed therein to admit the spindle 22. The retainer 24 may have a groove for admitting a keeper 52, such as a retaining ring 52. The retainer 24, retaining ring 52, and shoulder 20 may combine to resist longitudinal motion between the spindle 22 and the platform 46.

Any suitable lock 26 may be applied to rotationally secure the spindle 22 with respect to the platform 46. In one embodiment, a lock 26 may comprise first and second locking apertures 54 and 56 extending laterally though the flanges 42, 44 and the platform 46. These first and second locking apertures 54 and 56 may correspond to the first and second locking apertures 28 and 30 in the spindle, depending on the spindle's orientation within the platform 46.

For example, when the hitch 10 is in a horizontal position (as shown in FIG. 2), the second locking apertures 30, 56 align and a pin 58 may be inserted therethrough to prevent rotation or translation between the spindle 22 and platform 46. Similarly, when the hitch 10 is in a vertical position, the first locking apertures 28, 54 align and a pin 58 may be inserted therethrough to prevent rotation or translation between the spindle 22 and platform 46.

Referring to FIGS. 3–6, alternative embodiments of a hitch 10 in accordance with the present invention may provide various connections between a stem 18 and an intermediate portion 16. For example, a stem 18 may secure to an intermediate portion 16 by any suitable means including threading, welding, bolting, monolithically forming, and the like.

Figure 3:
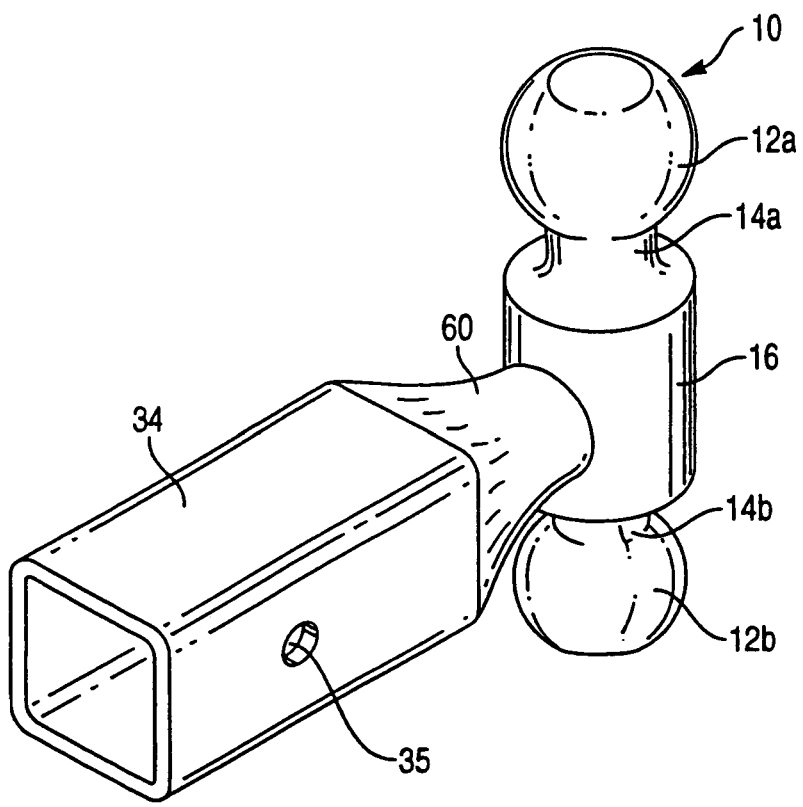
FIG. 3 is a perspective view of a monolithic, double-ball hitch secured to a trunnion in accordance with the present invention.

Referring to FIG. 3, a stem 18 may be formed with, or attached directly to, a trunnion 34. A trunnion 34 in accordance with the present invention may be of either tubular or solid material. The strength requirements of the trunnion 34 may determine whether or not the trunnion 34 needs be solid to withstand larger loads. If necessary, the stem 18 may have a taper 60 or shaft 60, thus compensating for the differences in size between the intermediate portion 16 and the trunnion 34. Accordingly, the taper 60 (e.g. shaft 60) may provide for rotation of the intermediate portion 16 with respect thereto. If the intermediate portion 16 rotates with respect to the shaft 60, then the trunnion 34 need not be removed from the receiver secured to a vehicle in order to rotate between the balls 12a, 12b. Alternatively, if the shaft 60 is fixed with respect to the intermediate portion 16, then the trunnion 34 may be rotated to serve as the selector mechanism to select between the balls 12a, 12b.

Figure 4:
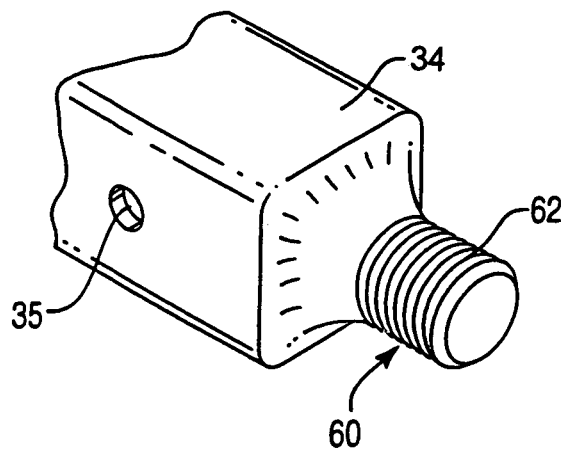
FIG. 4 is a perspective view of one embodiment of a trunnion for engaging a double-ball hitch in accordance with the present invention.

Referring to FIG. 4, a trunnion 34 may include a shaft 60 having threads 62 formed thereon. The threads 62 may be fabricated to properly secure to the intermediate portion 16 of a hitch 10. Care should be taken in such an embodiment to ensure that orientation and alignment are proper between the intermediate portion 16 and the trunnion 12, in order that proper operation may result.

For example, in certain embodiments, a safety mechanism such as a locking pin may be inserted through both the intermediate portion 16 and the shaft 60 to ensure that once the intermediate portion 16 and the shaft 60 have been threaded together, they are locked in place and cannot inadvertently loosen or unscrew.

Figure 5:
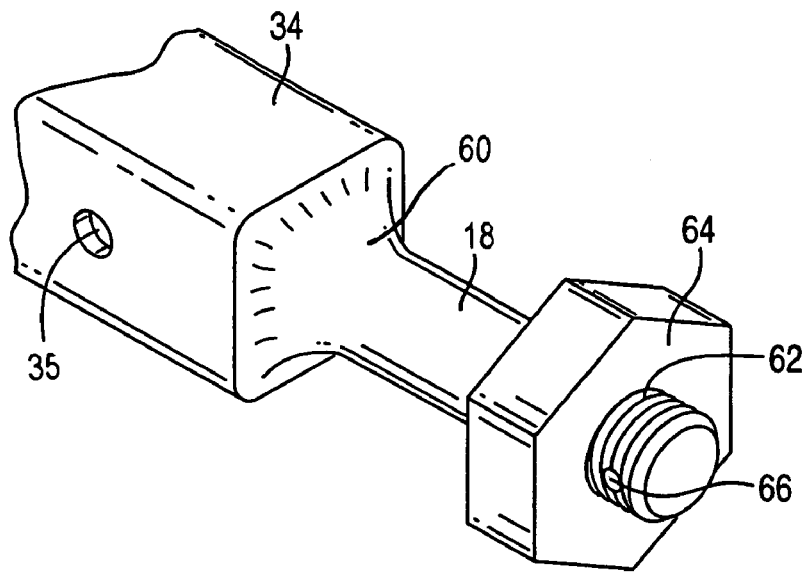
FIG. 5 is a perspective view of an alternative embodiment of a trunnion for engaging a double-ball hitch in accordance with the present invention.

Referring to FIG. 5, a stem 18 may have threads 62 along a portion or all of the length thereof. A fastener 64 may engage the threads, thus providing a barrier to resist separation between the intermediate portion 16 and the stem 18. Various geometries, including keyed geometries or registration elements may orient the intermediate portion 16 with respect to the stem 18 to assure proper orientation of the hitch 10 with respect to the trunnion 34. If desired, the unthreaded portion of the stem 18 may be keyed to engage the intermediate portion 16 and prevent rotation therebetween. A safety mechanism, such as a locking pin, may secure to the thread 62 or to an aperture 66 in the stem 18 to resist inadvertent loosening of the fastener 64.

Figure 6:
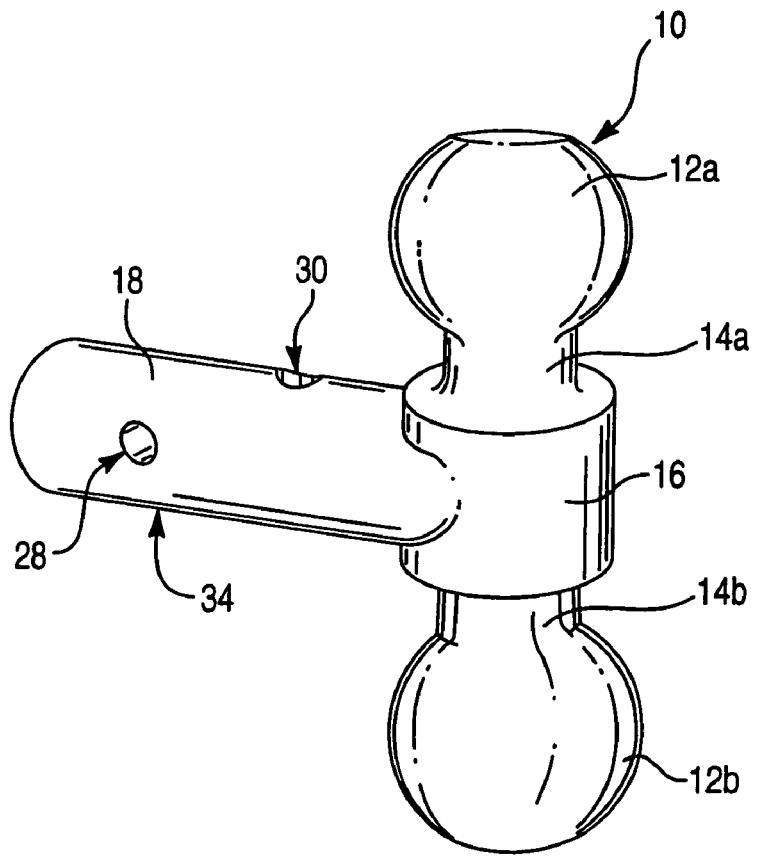
FIG. 6 is a perspective view of an embodiment of a cylindrical trunnion engaged to a double-ball hitch in accordance with the present invention.

Referring to FIG. 6, in certain embodiments, a trunnion 34 may secure directly to the intermediate portion 16. In essence, the trunnion 34 becomes the stem 18. The trunnion 34 may have any suitable cross-section. In selected embodiments, the trunnion 34 has a cylindrical shape. The trunnion 34 may be secured to the intermediate portion 16 by any suitable method, as discussed hereinabove, such as by welding, homogenous forging, or the like. Locking apertures 28, 30 in the trunnion 34 may serve to register the trunnion 34 with respect to the receiver, thus maneuvering the hitch 10 between two positions or orientations, a vertical, deployed position, and another horizontal stowed position.

Figure 7:
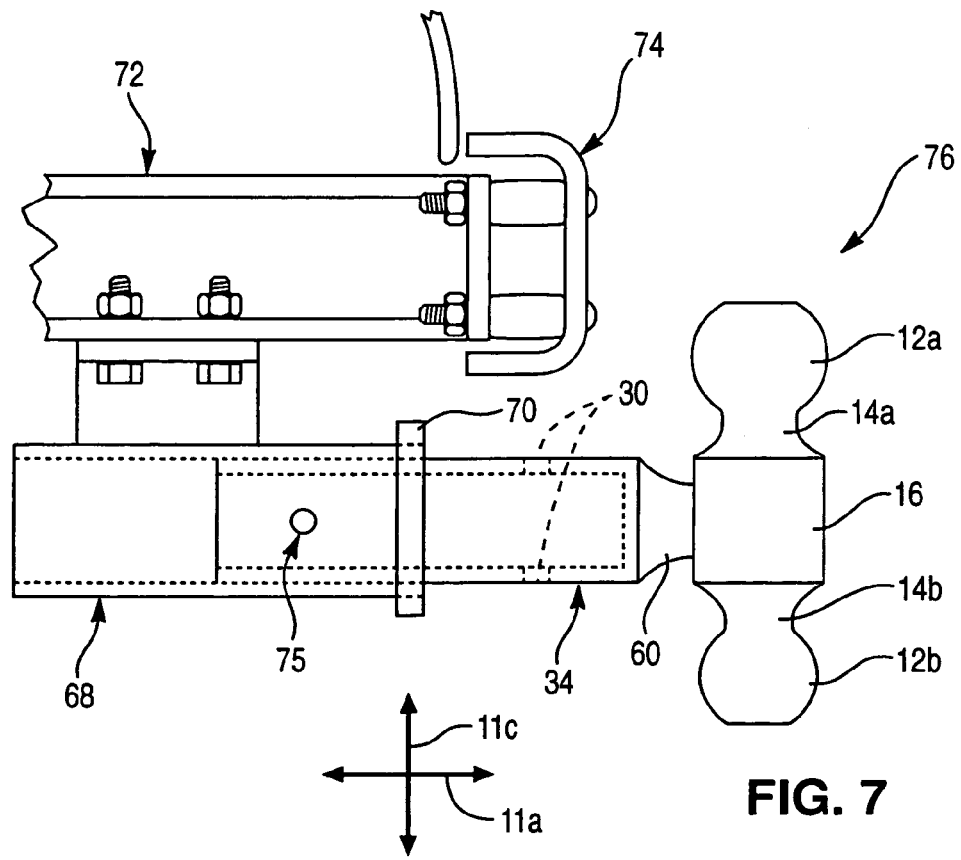
FIG. 7 is a side elevational view of a receiver hitch, connected to a vehicle undercarriage, housing a trunnion and double-ball hitch in a deployed position in accordance with the present invention.
Figure 8:
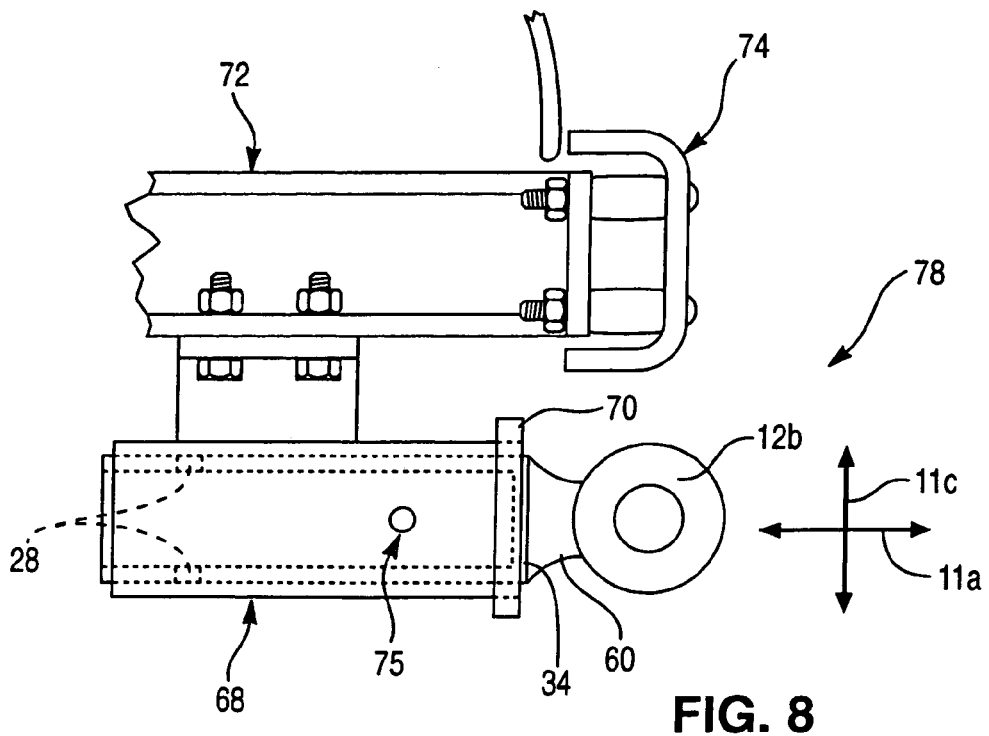
FIG. 8 is a side elevational view of the receiver hitch of FIG. 7 housing a trunnion and double-ball hitch in a stowed position in accordance with the present invention.

Referring to FIGS. 7 and 8, a receiver 68 with a reinforced opening, which may include a reinforcing collar 70, may be secured to the undercarriage 72 or frame 72 of a vehicle. Typically, such a vehicle includes a bumper 74. As discussed hereinabove, a trunnion 34 may serve to register the trunnion 34 with respect to the receiver 68, thus, maneuvering the hitch 10 between a vertical deployed position 76, and a distinct horizontal stowed position 78.

For example, an aperture 75 may be formed in the receiver 68 for receiving a locking pin. Corresponding apertures 28, 30 may be formed in the trunnion 34. When apertures 28 and 75 are aligned, a locking pin may be inserted to lock the trunnion 34 and hitch 10 in an extended, deployed, vertical position 76. When apertures 30 and 75 are aligned, a locking pin may be inserted to lock the trunnion 34 and hitch 10 in a retracted, stowed, horizontal position 78.

The transition from the deployed position 76 to the stowed position 78 and vice versa may depend on the cross-sectional shape of the trunnion 34. For example, if the cross-section of the trunnion 34 is circular, once the locking pin is removed from the locking aperture 75, the trunnion may be rotated about, and translate along, the longitudinal axis 1a until the new position is acquired and the locking pin may be reinserted. If the trunnion 34 has a square or other non-circular cross-section, then the trunnion 34 would have to be completely removed from the receiver 68, rotated the desired amount, reinserted into the receiver 34, and then translated until the proper location is achieved where the locking pin can be reinserted through the locking aperture 75 and corresponding trunnion 34, and apertures 28, 30.

Figure 9:
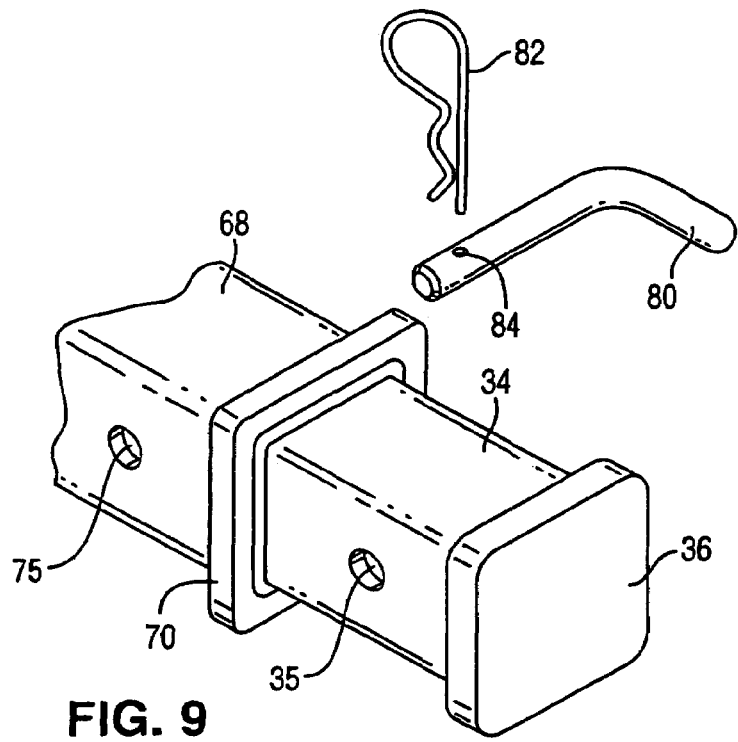
FIG. 9 is a perspective view of one embodiment of a rectangular trunnion in accordance with the present invention supporting a base plate for fastening a hitch mechanism thereto.

Referring to FIG. 9, in certain embodiments, a trunnion 34 may be received into a receiver 68 of rectangular cross-section. The receiver 68 may be reinforced by a reinforcing collar 70 adding additional strength against or resistance to fracture from the high stress at the opening. An aperture 35 may receive a pin 80 or suitable locking mechanism for securing the trunnion 34 in the receiver 68 and for orienting the trunnion 34 with respect to the receiver 68. The pin 80 itself may receive a lynch pin 82 in an aperture 84 therethrough to resist inadvertent removal. Any type of suitable base 36 may be secured to the trunnion 34. The trunnion 34 may be solid or tubular in structure.

Figure 10:
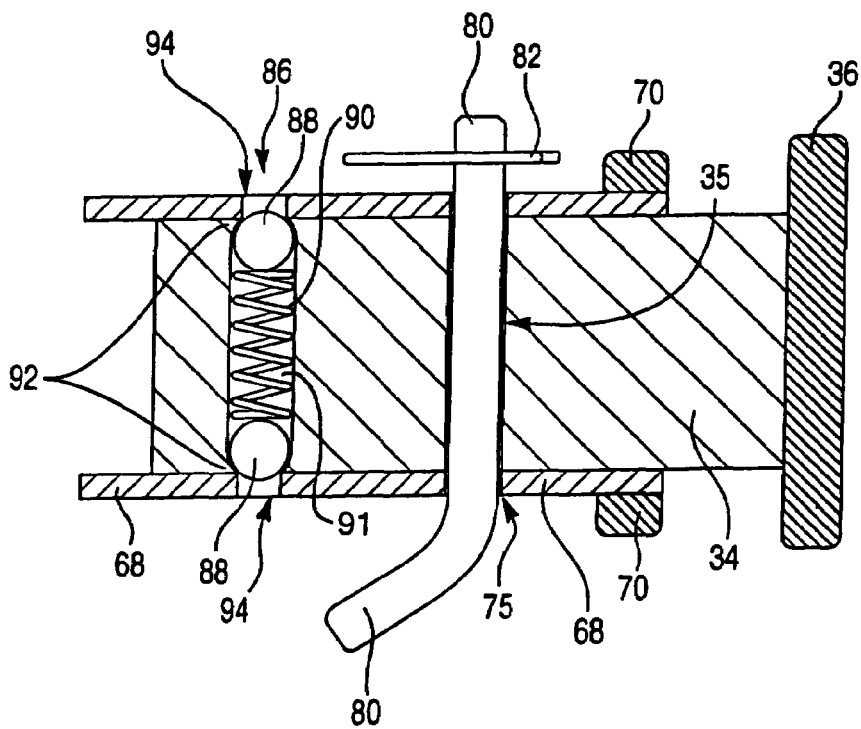
FIG. 10 is a cross-sectional, elevational view of one embodiment of a trunnion, having either a rectangular or right circular cylindrical cross-section in accordance with the present invention.

Referring to FIG. 10, the illustrated embodiment has a receiver 68, reinforced by a reinforcing collar 70, to receive a trunnion 34 supporting a base 36 configured to connect to or otherwise support a hitch 10. A pin 80 through corresponding locking apertures 35, 75 serves to secure the trunnion 34 with respect to the receiver 68. Additional apertures may be provided in the trunnion 34 to provide a variety of locations in which the trunnion 34 may be secured with respect to the receiver 68. In the illustrated embodiment, the pin 80 secures the trunnion 34 in the receiver 68 against towing loads, as well as orienting the trunnion 34 between positions to which the trunnion 34 may be rotatably moved in order to selectively deploy and stow a hitch 10 connected to the base 36.

In selected embodiments, a detent mechanism 86 may be installed in either the trunnion 34 or the receiver 68 to interact with the receiver 68 or trunnion 34, respectively. For example, the detent mechanism 86 may include a stop 88 or several stops 88. The stops 88 may be motivated by a biasing member 90. The stops 88 and biasing member 90 may be maintained with a cavity 91 of the selected structure. In the illustrated embodiment this would be the trunnion 34, with a retainer 92 or multiple retainers 92.

Thus, the biasing member 90 may act to expel the stops 88 from the cavity 91 to the extent that the stops 88 are limited by the retainers 92. The retainer 92 may, however, permit the stops 88 to extend slightly from the cavity 91 in order to engage a nearby structure.

In the illustrated embodiment, the nearby structure is the receiver 68. Engagement apertures 94 or relief locations 94 may be formed in the nearby structure 68. When a stop 88 passes thereover, the stop 88 engages the relief location 94 and resists further relative motion therebetween. The latches or detent mechanism 86 may be configured to resist rotation, translation, or both of the trunnion 34 with respect to the receiver 68.

The detent mechanisms 86 may be configured to indicate proper positioning of the trunnion 34 with respect to the receiver 68 in a longitudinal direction 11a upon insertion into the receiver 68. Alternatively, the detent mechanism 86 may indicate a proper rotational orientation of the trunnion 34 with respect to the receiver 68 by resisting motion at a preselected location. Application of additional modest force may dislodge the stops 88 from the relief locations 94 permitting rotation or removal of the trunnion 34 or other moving part.

In several of the embodiments described hereinabove, various members rotate with respect to other members. In any of the foregoing devices, a detent mechanism 86 may be used to orient or restrain a rotating member with respect to another member.

Figure 11:
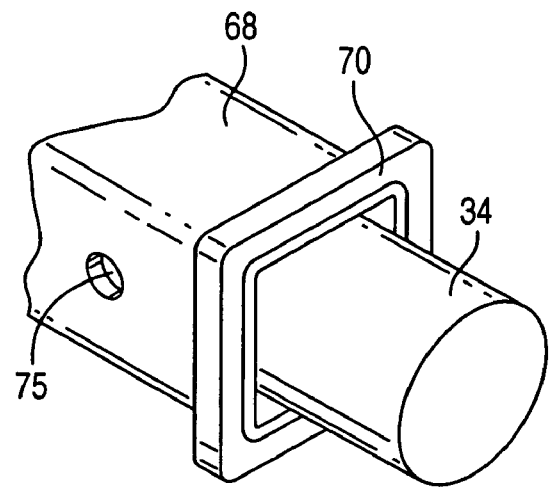
FIG. 11 is a perspective view of one embodiment of a trunnion of circular cross-section mounted with a receiver of rectangular cross-section.

Referring to FIG. 11, a trunnion 34 and receiver 68 may both be rectangular. However, in an alternative embodiment, a cylindrical trunnion 34 may be contained within a rectangular receiver 68 or vice versa. As discussed hereinabove, a reinforcing collar 70 may protect the receiver 68 against fracture at locations of high stress. A pin 80 may secure the trunnion 34 to the receiver 68 through the apertures 75, 35. A lynch pin 82 through an aperture 84 in pin 80 may secure the pin 80 against accidental removal from the trunnion 68. If the cross-section of the receiver 68 is square, then the trunnion 34 may, for example, be rotated 90°, 120°, 180°, or any other suitable angle in the receiver 68 between various deployed and stowed positions of hitches 10 connected to the base 36.

Figure 12:
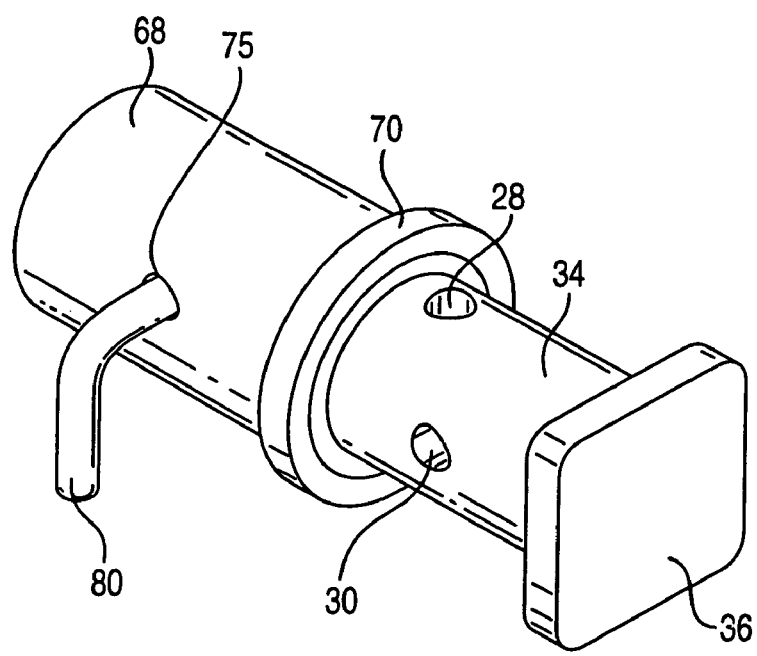
FIG. 12 is a perspective view of one embodiment of a trunnion having a cylindrical cross-section mounted with a matching trunnion having a circular cross-section.

Referring to FIG. 12, a trunnion 34 may be circular or rectangular in cross-section. Accordingly, the receiver 68 may be of a corresponding rectangular or circular cross-section as described hereinabove. In certain embodiments, a cylindrical trunnion 34 may be received into a receiver 68 of circular cross-section or vice versa. As discussed hereinabove, a cylindrical trunnion 34 may provide transition between positions 76, 78 without necessitating removal of the trunnion 34 from the receiver 68. Multiple apertures 28, 30 may be provided in the trunnion 34 to provide multiple alignments with the locking aperture 75, thus generating multiple positions of the base 36 or the hitch 10 in other embodiments.

Figure 13:
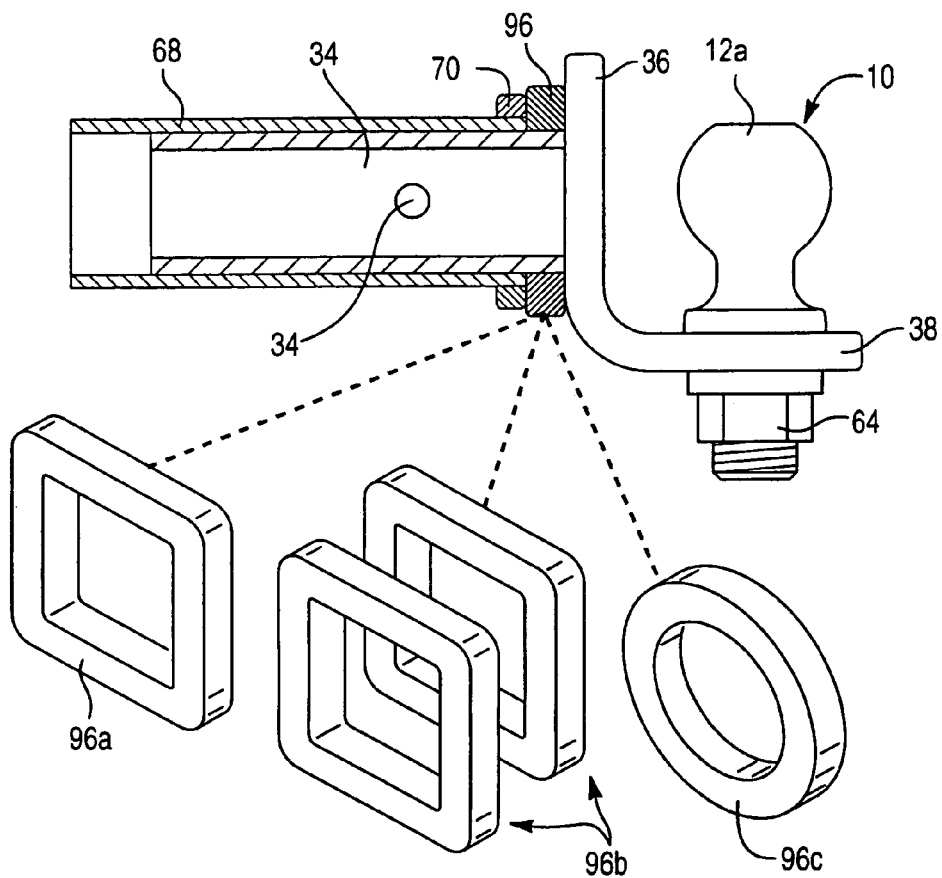
FIG. 13 is a cross-sectional, side elevational view of one embodiment of a trunnion and base plate, illustrating application of a resilient, silencing collar in accordance with certain aspects of the present invention.

Referring to FIG. 13, a trunnion 34, regardless of cross-section, is typically constructed to have a manufacturing tolerance with respect to the receiver 68. Accordingly, larger tolerances provide an easier assembly of the trunnion 34 in the receiver 68. Nevertheless, whatever tolerance may be created in manufacture is increased with wear. These tolerances permit vibrations to resonate between the trunnion 34 and receiver 68 resulting in unwanted noise, wear, and the like.

In certain embodiments in accordance with the present invention, a damper or sleeve 96 may be installed between a receiver 68 and a base 36 configured to support a hitch. A polymeric material, such as an elastomeric composition, may have an appropriate resilience and stiffness for selective compression between the trunnion 34 or reinforcing collar 70 and the base 36.

Various sleeves 96a, 96b, 96c, may fit variations in the cross-section of the trunnion 34. Moreover, since various manufacturers may provide different lengths of trunnions 34 extending between the reinforcing collar 70 and the base 36, more than one damper or sleeve 96b may fit between the receiver 68 and the base 36. Meanwhile, a rectangular damper or sleeve 96a or a circular damper or sleeve 96c may be used according to the particular cross-section of the trunnion 34.

Figure 14:
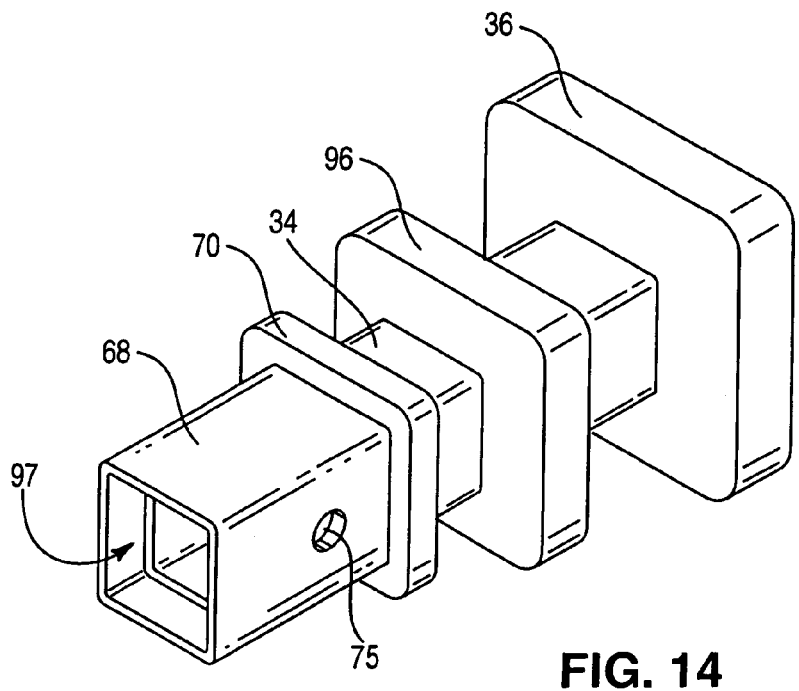
FIG. 14 is a perspective view of a receiver and trunnion, with a base plate for a hitch, illustrating the use of a silencing member.

Referring to FIG. 14, a damper or sleeve 96 may be installed between a base 36 and a receiver 68 to provide a force resisting compression. Accordingly, positioning the base 36 in close proximity to the receiver 68 causes a certain amount of compression in the damper 96, biasing the position of the trunnion 34 and loading it with respect to the receiver 68. Accordingly, the trunnion 34 is not free to chatter within the way 97 or interior 97 of the receiver 68. The damper 96 may apply forces in multiple directions. Moreover, a damper 96 manufactured of a suitable elastomeric material may damp vibrations in multiple dimensions.

Figure 15:
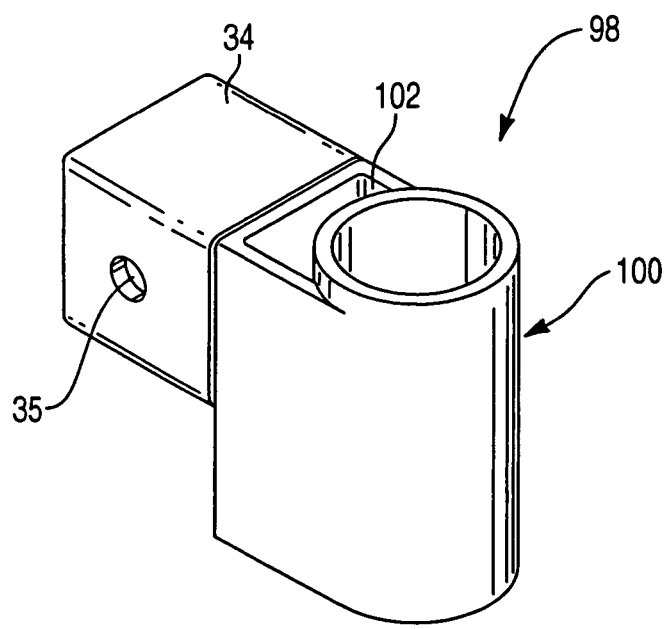
FIG. 15 is a perspective view of one embodiment of a trunnion supporting a stand in a configuration suitable for mounting to a receiver of a recreational vehicle.

Referring to FIG. 15, in selected embodiments, a trunnion 34 may support a standard 98 configured to support a device, such as, for example, a flagpole. A flagpole or other standard 98 may comprise a tube 100 to receive a device, such as a flagpole. The flagpole may extend therethrough and be supported in a transverse direction 11c by the ground therebelow. The location of the trunnion 34, in a receiver 68 spaced above the ground, provides a greater bearing distance than is commonly available in standards of other configurations. Accordingly, moment loadings on the standard may be reduced. However, if desired the tube 100 may have a bottom, placed therein to support the device (e.g. flagpole) in the transverse direction 11c rather than relying on the ground. The tube 100 may be supported by a bracket 102. The bracket 102 may, in turn, be supported by the trunnion 34.

In certain embodiments, the standard 98 may be manufactured of an extruded material. Aluminum may serve well for the standard 98. Similarly, the trunnion 34 may be fabricated of aluminum for ease in fabrication. Since the standard 98 need not sustain the same loads as may a hitch 10, lighter materials, such as aluminum, or metals of lighter gauges may serve as the standard 98 and trunnion 34. The bracket 102 may be secured to the trunnion 34 by welding, bolting, or by any other suitable method.

Figure 16:
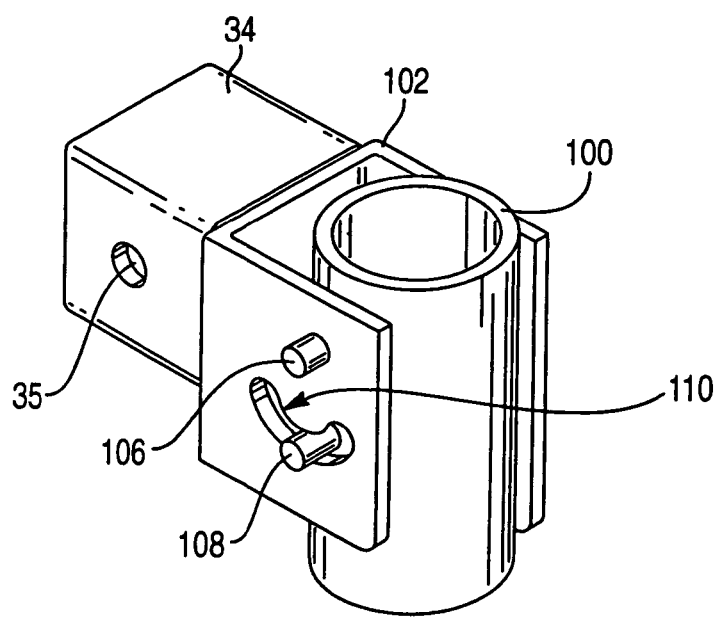
FIG. 16 is a perspective view of an embodiment of a trunnion tiltably supporting a stand in a configuration suitable for mounting to a receiver of a recreational vehicle.

Referring to FIG. 16, the tube 100 of a standard 98 may selectively tilt to better display the flag supported thereby. In certain embodiments, a tiltable flagpole standard 98 may have a pivot 106 connecting the tube 100 to the bracket 102. A securement pin 108 may extend from the tube 100 and slide within the confines of a corresponding groove 110. A fastener may engage the securement pin 108 and secure the bracket 102 at a desired angle of tilt with respect to the tube 100.

From the above discussion, it will be appreciated that the present invention provides a monolithic, double-ball hitch with a stem. The stem may engage any suitable hitch mount, including stowable hitch mounts. Additionally, the stem of a monolithic, double-ball hitch may secure to or provide a trunnion for securing the hitch to a receiver secured to the frame or undercarriage of a vehicle.

A trunnion in accordance with the present invention may have any suitable cross-section and may have apertures formed therein to provide multiple securement locations between the trunnion and the receiver. If desired, a detent mechanism may facilitate positioning of parts moving with respect to one another. Additionally, dampers may be applied to a trunnion to reduce chatter (relative movement to and fro) and vibration between a trunnion and a corresponding receiver. Moreover, many useful components may be secured to a trunnion. For example, a flagpole standard or the like may be secured to a trunnion to provide securement of a device, such as a flagpole, to a vehicle.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

What is claimed is:

1. An apparatus comprising:
   a base having a supporting portion to connect to a vehicle;
   a mount positionable with respect to the base between a stowed position wherein the mount extends adjacent the supporting portion of the base on a first side of the base and a deployed position wherein the mount extends from the base on a second side thereof; a first locking structure located and configured to selectively maintain the mount in one of the stowed position and the deployed position;
   a hitch coupled with the mount, the hitch including a first ball extending in a first direction, at least a second ball extending in a second direction, distinct from the first direction and an intermediate portion between the first ball and the at least a second ball, wherein the first ball, the at least a second ball and the intermediate portion are formed together as a single piece; and
   a second locking structure located and configured to selectively maintain the hitch at a selected one of a plurality of positions with respect to the mount.

2. The apparatus of claim 1, further comprising a stem extending from the hitch in a third direction, distinct from both the first and second directions, to support the hitch relative to the mount.

3. The apparatus of claim 1, wherein the first direction and the second direction are substantially collinear and extend substantially opposite one another.

4. The apparatus of claim 2, wherein the stem is rotatable with respect to the hitch.

5. The apparatus of claim 2, wherein the stem is integrally formed with the hitch.

6. The apparatus of claim 5, wherein the stem is substantially cylindrical in shape.

7. The apparatus of claim 6, wherein the stem is rotatably coupled with the mount.

8. The apparatus of claim 2, wherein the stem is coupled to the hitch by an interface selected from the group consisting of threading, welding, bolting, swaging, riveting, and pinning.

9. The apparatus of claim 2, wherein the intermediate portion includes a pedestal formed between the first ball and the at least a second ball, and wherein the stem is secured in fixed relation with respect to the pedestal.

10. The apparatus of claim 1, wherein the first ball exhibits a first diameter and wherein the at least a second ball exhibits a second diameter different from the first diameter.

11. The apparatus of claim 1, wherein the first locking structure further comprises at least a first pin sized and configured for insertion through at least a first aperture formed in the mount and through at least one aperture formed in the base.

12. The apparatus of claim 1, wherein the second locking structure further comprises at least a first pin sized and configured for insertion through at least a first aperture formed in the mount and through at least a first aperture formed in the hitch.

13. An apparatus comprising:
   a trunnion extending in a first direction;
   a base having a first end and a second end, secured proximate the first end to the trunnion;
   a mount secured to the base and positionable relative thereto between a first position wherein the mount extends from the base, and at least a second position substantially half a revolution from the first position wherein the mount extends adjacent the trunnion;
   a fastener engaging the mount to selectively position the mount with respect to the base in the first position and in the at least a second position; and
   a hitch coupled with the mount, the hitch including a first ball extending in a first direction, and at least a second ball extending in a second direction, wherein the first ball and the at least a second ball are formed together as a single piece.

14. The apparatus of claim 13, wherein the hitch further includes an intermediate portion formed between the first ball and the at least a second ball, a first neck portion transitioning from the intermediate portion to the first ball and a second neck portion transitioning from the intermediate portion to the at least a second ball.

15. The apparatus of claim 13, wherein the at least a second ball is substantially spherical and solid across a diameter thereof.

16. The apparatus of claim 14, wherein the first ball, the at least a second ball and the intermediate portion are substantially collinear.

17. The apparatus of claim 14, wherein the intermediate portion is substantially cylindrical.

18. The apparatus of claim 13, further comprising a stem coupled to the intermediate portion of the hitch and the mount.

19. The apparatus of claim 13, further comprising a fastener located and configured for selectively positioning the hitch relative to the mount.

20. An apparatus comprising:

a trunnion;

a base secured to the trunnion;

a mount securable to the base at a first position wherein the mount extends in a first direction and is juxtaposed adjacent the trunnion, and at least a second position wherein the mount extends from the base in a second direction substantially directionally opposite the first direction;

a securing structure cooperative with the mount to selectively position the mount with respect to the base in the first position and in the at least a second position; and a hitch coupled with the mount, the hitch including a first ball and at least a second ball, wherein the first ball and the at least a second ball are formed together as a single piece.

* * * * *